(12) United States Patent
Hou et al.

(10) Patent No.: US 12,556,243 B2
(45) Date of Patent: Feb. 17, 2026

(54) PORT SELECTION WITH LOW COMPLEXITY

(71) Applicant: Telefonaktiebolaget LM Ericsson (publ), Stockholm (SE)

(72) Inventors: Xueying Hou, Lund (SE); Mats Åhlander, Solna (SE); Sebastian Faxér, Stockholm (SE); Krister Edström, Hjärup (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 91 days.

(21) Appl. No.: 18/576,233

(22) PCT Filed: Jul. 7, 2022

(86) PCT No.: PCT/SE2022/050698
§ 371 (c)(1),
(2) Date: Jan. 3, 2024

(87) PCT Pub. No.: WO2023/282839
PCT Pub. Date: Jan. 12, 2023

(65) Prior Publication Data
US 2024/0313832 A1 Sep. 19, 2024

Related U.S. Application Data

(60) Provisional application No. 63/220,221, filed on Jul. 9, 2021.

(51) Int. Cl.
H04B 7/0456 (2017.01)
H04L 25/02 (2006.01)

(52) U.S. Cl.
CPC ......... *H04B 7/0456* (2013.01); *H04L 25/021* (2013.01)

(58) Field of Classification Search
CPC ... H04B 7/0456; H04B 7/0413; H04L 25/021; H04L 25/0224
See application file for complete search history.

(56) References Cited

U.S. PATENT DOCUMENTS 10,389,414 B1   8/2019   Qi et al.
12,316,577 B2 *  5/2025  Liu ....................... H04L 5/0078
(Continued)

FOREIGN PATENT DOCUMENTS

CN   107547117 A   1/2018
CN   109309517 A   2/2019
(Continued)

OTHER PUBLICATIONS

Supplementary European Search Report for European Patent Application No. 22838134.9, mailed Oct. 18, 2024, 4 pages.
(Continued)

*Primary Examiner* — Vineeta S Panwalkar
(74) *Attorney, Agent, or Firm* — Withrow & Terranova, PLLC

(57) ABSTRACT

Systems and methods are disclosed for port selection for a wireless communication system. In one embodiment, a method performed by a Radio Access Network (RAN) node comprises dividing a channel matrix of one subcarrier of a Multiple-Input-Multiple-Output (MIMO) channel between an antenna array of the RAN node and a particular User Equipment (UE) into sub-matrices. The method further comprises forming a re-ordered channel matrix as a concatenation of the sub-matrices and forming a port-sorting matrix based on eigen vector matrices and eigen value matrices obtained via Eigen Value Decompositions (EVDs) performed on channel covariance matrices for the sub-matrices. The method further comprises applying the port-sorting matrix to the re-ordered channel matrix, re-ordering column vectors in the port-sorted channel matrix based on
(Continued)

eigen values obtained from the EVDs, and applying grouping of the re-ordered, port-sorted channel matrix and port sorting accordingly to obtain a final port-sorted channel matrix.

16 Claims, 8 Drawing Sheets

(56) References Cited

U.S. PATENT DOCUMENTS

| | | |
|---|---|---|
| 2006/0071807 A1 | 4/2006 | Sadowsky |
| 2006/0120478 A1 | 6/2006 | Kim et al. |
| 2009/0103641 A1 | 4/2009 | Masui et al. |
| 2012/0002759 A1* | 1/2012 | Lin ................ H04B 7/0854 375/340 |
| 2013/0215989 A1 | 8/2013 | Miyatani et al. |
| 2018/0167183 A1 | 6/2018 | Zhang et al. |
| 2019/0174527 A1 | 6/2019 | Park et al. |
| 2019/0260613 A1 | 8/2019 | Lee et al. |
| 2020/0229201 A1 | 7/2020 | Tong et al. |
| 2021/0143874 A1 | 5/2021 | Park et al. |
| 2022/0209839 A1 | 6/2022 | Cheng et al. |

FOREIGN PATENT DOCUMENTS

| | | |
|---|---|---|
| CN | 111758272 A | 10/2020 |
| EP | 1657829 A1 | 5/2006 |
| EP | 4087151 A1 | 11/2022 |
| WO | 2017008307 A1 | 1/2017 |
| WO | 2017219739 A1 | 12/2017 |
| WO | 2018050088 A1 | 3/2018 |
| WO | 2020154832 A1 | 8/2020 |
| WO | 2020200471 A1 | 10/2020 |
| WO | 2021135837 A1 | 7/2021 |
| WO | 2023282840 A1 | 1/2023 |

OTHER PUBLICATIONS

Supplementary European Search Report for European Patent Application No. 22838133.1, mailed Oct. 16, 2024, 5 pages.
Author Unknown, "Technical Specification Group Radio Access Network; NR; Physical layer procedures for data (Release 16)," Technical Specification 38.214, Version 16.6.0, Jun. 2021, 3GPP Organizational Partners, 172 pages.
Bhavatharini, et al., "Offloading Mobile Computations To Cloud To Save Mobile Energy," International Journal of Engineering Research and Technology, Jul. 30, 2018, pp. 26-30.
International Search Report and Written Opinion for International Patent Application No. PCT/SE2022/050699, mailed Sep. 16, 2022, 15 pages.
International Search Report and Written Opinion for International Patent Application No. PCT/SE2022/050698, mailed Sep. 27, 2022, 14 pages.
Examination Report for European Patent Application No. 22838134.9, mailed Oct. 30, 2024, 7 pages.
Examination Report for European Patent Application No. 22838133.1, mailed Oct. 28, 2024, 7 pages.

* cited by examiner

```
┌─────────────────────────────────────────────────────────────────────┐
│  DIVIDE CHANNEL MATRIX, H, INTO TWO (OR MORE) SUB-MATRICES AND FORM RE-  │
│                  ORDERED CHANNEL MATRIX, H_re-order                     │
│                                 200                                     │
│  ┌───────────────────────────────────────────────────────────────────┐ │
│  │  COMPUTE CORRELATION VALUES FOR ALL COMBINATIONS (I.E., ALL PAIRS) OF │ │
│  │           COLUMN VECTORS OF THE CHANNEL MATRIX, H                 │ │
│  │                              200A                                 │ │
│  └───────────────────────────────────────────────────────────────────┘ │
│  ┌───────────────────────────────────────────────────────────────────┐ │
│  │  SELECT COLUMN VECTORS OF THE CHANNEL MATRIX, H, FOR THE FIRST SUB- │ │
│  │              MATRIX (FOR A FIRST CHANNEL GROUP)                   │ │
│  │                              200B                                 │ │
│  │  ┌─────────────────────────────────────────────────────────────┐  │ │
│  │  │  SELECT COMBINATION (PAIR) OF COLUMN VECTORS HAVING THE     │  │ │
│  │  │     HIGHEST CORRELATION VALUE FOR THE FIRST SUB-MATRIX      │  │ │
│  │  │                          200B1                              │  │ │
│  │  └─────────────────────────────────────────────────────────────┘  │ │
│  │  ┌─────────────────────────────────────────────────────────────┐  │ │
│  │  │   SELECT ONE OF THE SELECTED COMBINATION (PAIR) OF COLUMN   │  │ │
│  │  │    VECTORS AS A BASIS (REFERENCE) FOR THE FIRST SUB-MATRIX  │  │ │
│  │  │                          200B2                              │  │ │
│  │  └─────────────────────────────────────────────────────────────┘  │ │
│  │  ┌─────────────────────────────────────────────────────────────┐  │ │
│  │  │    SELECT REMAINING COLUMN VECTORS FOR THE FIRST SUB-MATRIX │  │ │
│  │  │   BASED ON CORRELATION VALUES OF OTHER COLUMN VECTORS WITH  │  │ │
│  │  │                         THE BASIS                           │  │ │
│  │  │                          200B3                              │  │ │
│  │  └─────────────────────────────────────────────────────────────┘  │ │
│  └───────────────────────────────────────────────────────────────────┘ │
│  ┌───────────────────────────────────────────────────────────────────┐ │
│  │ SELECT THE REMAINING COLUMN VECTORS OF THE CHANNEL MATRIX, H, FOR │ │
│  │         THE SECOND SUB-MATRIX (FOR A SECOND CHANNEL GROUP)        │ │
│  │                              200C                                 │ │
│  └───────────────────────────────────────────────────────────────────┘ │
│  ┌───────────────────────────────────────────────────────────────────┐ │
│  │   CONCATENATING THE SUB-MATRICES TO FORM THE RE-ORDERED CHANNEL   │ │
│  │                      MATRIX, H_re-order                           │ │
│  │                              200D                                 │ │
│  └───────────────────────────────────────────────────────────────────┘ │
└─────────────────────────────────────────────────────────────────────┘
                                   │
                                   ▼
                              ⎛ FIG. 2B ⎞
```

FORM A PORT-SORTING MATRIX BASED ON EVDs OF THE SUB-MATRICES AND APPLY THE PORT-SORTING MATRIX TO THE RE-ORDERED CHANNEL MATRIX, $H_{re\text{-}order}$
202

PERFORM EVD ON EACH SUB-MATRIX (I.E., FOR EACH CHANNEL GROUP)
202A

COMPUTE CHANNEL COVARIANCE MATRIX FOR EACH SUB-MATRIX
202A1

PERFORM A EVD ON THE CHANNEL COVARIANCE MATRIX FOR EACH SUB-MATRIX
202A2

FORM THE PORT-SORTING MATRIX BASED ON THE EIGEN VECTOR MATRICES AND EIGEN VALUE MATRICES PROVIDED BY THE EVDs OF THE CHANNEL COVARIANCE MATRICES FOR THE SUB-MATRICES
202B

APPLY THE PORT-SORTING MATRIX TO THE RE-ORDERED CHANNEL MATRIX, $H_{re\text{-}order}$, TO PROVIDE A PORT-SORTED CHANNEL MATRIX
202C RE-ORDER THE COLUMN VECTORS OF THE PORT-SORTED CHANNEL MATRIX BASED ON THE EIGEN VALUES TO PROVIDE A RE-ORDERED, PORT-SORTED CHANNEL MATRIX
204

```
                    ┌─────────┐
                    │ FIG. 2B │
                    └────┬────┘
                         ▼
┌─────────────────────────────────────────────────────────────────┐
│  APPLY GROUPING OF THE RE-ORDERED, PORT-SORTED CHANNEL MATRIX AND│
│   PORT SORTING ACCORDINGLY TO PROVIDE A FINAL PORT-SORTED CHANNEL│
│                              MATRIX                              │
│                               206                                │
│  ┌───────────────────────────────────────────────────────────┐   │
│  │  DIVIDE THE RE-ORDERED, PORT-SORTED CHANNEL MATRIX INTO TWO (OR│
│  │                      MORE) SUB-MATRICES                   │   │
│  │                            206A                           │   │
│  └───────────────────────────┬───────────────────────────────┘   │
│  ┌───────────────────────────▼───────────────────────────────┐   │
│  │ COMPUTE CHANNEL COVARIANCE MATRICES FOR THE SUB-MATRICES OF THE│
│  │    RE-ORDERED, PORT-SORTED CHANNEL MATRIX AND PERFORM EVDs│   │
│  │                            206B                           │   │
│  └───────────────────────────┬───────────────────────────────┘   │
│  ┌───────────────────────────▼───────────────────────────────┐   │
│  │  FORM A PORT-SORTING MATRIX BASED ON THE EIGEN VECTOR MATRICES│
│  │   AND EIGEN VALUE MATRICES PROVIDED BY THE EVDs OF THE CHANNEL│
│  │     COVARIANCE MATRICES FOR THE SUB-MATRICES OF THE RE-ORDERED,│
│  │                PORT-SORTED CHANNEL MATRIX                 │   │
│  │                            206C                           │   │
│  └───────────────────────────┬───────────────────────────────┘   │
│  ┌───────────────────────────▼───────────────────────────────┐   │
│  │   APPLY THE PORT-SORTING MATRIX TO THE OF THE RE-ORDERED, PORT-│
│  │  SORTED CHANNEL MATRIX TO PROVIDE THE FINAL PORT-SORTED CHANNEL│
│  │                            MATRIX                         │   │
│  │                            206D                           │   │
│  └───────────────────────────────────────────────────────────┘   │
└─────────────────────────────┬───────────────────────────────────┘
                              ▼
        ┌─────────────────────────────────────────┐
        │           PERFORM LAYER SELECTION       │
        │                   208                   │
        └─────────────────────┬───────────────────┘
                              ▼
        ┌─────────────────────────────────────────┐
        │         COMPUTE BEAMFORMING WEIGHTS     │
        │                   210                   │
        └─────────────────────────────────────────┘
```

*FIG. 2C*

PORT SELECTION WITH LOW COMPLEXITY

RELATED APPLICATIONS

This application is a 35 U.S.C. § 371 national phase filing of International Application No. PCT/SE2022/050698, filed Jul. 7, 2022, which claims the benefit of provisional patent application Ser. No. 63/220,221, filed Jul. 9, 2021, the disclosures of which are hereby incorporated herein by reference in their entireties.

TECHNICAL FIELD

The present disclosure relates to a wireless communication system and, more specifically, to port selection for Multiple-Input-Multiple-Output (MIMO) communication in a wireless communication system.

BACKGROUND

Multiple-Input-Multiple-Output (MIMO) communication is a technique for serving several users simultaneously with the same time and frequency resource in a wireless communication network. This technique, in which the base station (i.e., next generation Node B (gNB) in the case of Third Generation Partnership Project (3GPP) New Radio (NR)) and/or the User Equipments (UEs) are equipped with multiple antennas, allows for spatial diversity to transmit data in both uplink (UL) and downlink (DL) directions. The obtained spatial diversity increases the capacity of the network dramatically, or equivalently one can say that it offers a more efficient utilization of the frequency spectrum. Moreover, MIMO can reduce the inter-cell and intra-cell interferences which in turn leads to more frequency re-use. As the electromagnetic spectrum is a rare resource, MIMO is a vital solution for the extension of the capacity of wireless communication systems.

A key point for effective deployment of the MIMO communication technology is the access to estimates of the channel responses between the base station and the UEs in the associated network cell, which is usually called Channel State Information (CSI). These channel responses include those in DL and UL transmissions and help to form the beams from the base station toward the intended UEs. The channels in the UL direction are usually estimated using pilot symbols (reference signals) sent by the UEs and received by the base station, which are often called "sounding" symbols or signals and, for example, implemented as Sounding Reference Symbols in 3GPP Long Term Evolution (LTE) and NR.

For a Time Division Duplexing (TDD) based system, it is possible to apply the physical channel property of reciprocity and use the UL sounding and channel estimation to obtain the DL channel estimates as well. The DL channel estimates, consequently, can be used to calculate the weight for the beamforming. In fact, the Reciprocity Assisted Transmission (RAT) algorithms for beamforming in the downlink transmission are amongst the most successfully exploited algorithms in MIMO and are predicted to be widely exploited in the fifth generation of cellular wireless communication networks. This class of algorithms are applicable whenever the so-called channel reciprocity holds. More precisely, they assume that the channel responses in the uplink and downlink directions are the same up to a change in the role of the transmitter and receiver and disregarding output power differences. Using this fact, they use the estimated channel in the uplink direction for beamforming in the downlink. This principle holds when time-division multiplexing is used for sharing data transmission time between the DL and UL transmissions. In summary, in reciprocity-based beamforming, from the previously transmitted pilot symbols from the UEs to the base station, the UL channels are estimated. Then, these estimates will be valid in the DL direction by transposing the channel matrices.

In Fourth Generation (4G) and Fifth Generation (5G), the introduction of Advanced Antenna Systems (AASs) on the base stations has allowed for the possibility to do beamforming and spatial multiplexing schemes with many more transmission layers than was previously possible in legacy antenna systems using only two or four antennas. In spatial multiplexing, several data streams (layers) are transmitted over independent channels that are spatially separated in space. Increasing the number of parallel layers that can be sent at the same time increases the amount of data that can be passed over the air.

Beamforming is a technique where a weighted coherent phase shift is added to each base station antenna element with the effect of creating a narrow, concentrated beam of energy from the base station antenna array towards the direction of a UE to which the base station is going to transmit data. A Minimum Mean Square Estimator (MMSE) criteria is commonly used for computing the beam weights needed for spatial multiplexing and beamforming. The channel matrix is denoted as $H \in \mathbb{C}(N_t, N_r)$, where $N_t$ is the number of antennas at base station and $N_r$ is the number of antenna ports/antennas in the UE. When the transmitted layers, i.e., L, to the UE is equal to the number of receiver antennas, i.e., $N_r$, then the MMSE criteria results in beam weights according to the equation $W = H^*(\sigma^2 I + H^T H^*)^{-1}$, where $W \in \mathbb{C}(N_t, N_r)$ is the beamforming weight matrix. Each element in H consists of a channel estimate sample for one antenna and one user-layer. Thus, the channel matrix H is built up of stacked column vectors, one column vector for each layer. Each row vector in the channel matrix H holds the channel estimate samples for a respective base station antenna. There is one channel matrix for each subcarrier or group of subcarriers; thus, there will be one corresponding beam weight computation for each subcarrier or group of subcarriers. The variable $\sigma^2$ is an estimate of the noise energy in the channel estimates and has the purpose of balancing the amount of zero forcing and conjugate beamforming in the MMSE.

The channel matrix H is measured by a UE first transmitting a reference signal from each one of its transmitter antennas. For the discussion herein, this reference signal is SRS; however, the other uplink reference signals may be used. The base station then uses this reference signal to measure the estimated channel on each of its receiver antennas. This creates a picture of the channel properties between the UE and base station antennas, which is captured in the channel matrix H. Each SRS signal is typically transmitted from one transmit antenna in the UE at a time. A precoder may also be applied to the SRS with the effect of the SRS being distributed over several transmit antennas of the UE.

When transmitting with a rank (i.e., number of layers) that is below the available number of antennas in the UE, some mapping between SRS ports and transmission layers is required. One might believe that all the channel estimates from all the available SRS ports is always be used in the MMSE calculation of the beam weight matrix W. There are however several problems with such an approach. The major issue is that this will make the MMSE computation unnecessary complex as the computational complexity of the beam weight computations increases by $L^3$ where L is the number of transmission layers. As an example, to use four SRS port to calculate a single layer with the MMSE would require ~64 times the complexity compared to the calculation of a single layer. Also, when additional ports are introduced, the zero-forcing part of the MMSE will attempt to restrict the inter-layer interference between the SRS ports, as each SRS port is interpreted as being one transmission layer. As we only have a single layer and no inter-layer interference in reality exists, one can understand that the zero-forcing part is unnecessary and that it will reduce the performance of the beamforming.

SUMMARY

Systems and methods are disclosed for port selection for Multiple-Input-Multiple-Output (MIMO) communication in a wireless communication system. In one embodiment, a method performed by a Radio Access Network (RAN) node comprises dividing a channel matrix, H, into two or more sub-matrices, wherein the channel matrix, H, is a full channel matrix of one subcarrier of a MIMO channel between an antenna array of the RAN node and a particular User Equipment (UE) and each sub-matrix of the two or more sub-matrices comprises two or more column vectors of the channel matrix, H. The method further comprises forming a re-ordered channel matrix, $H_{re\text{-}order}$, as a concatenation of the two or more sub-matrices and forming a port-sorting matrix based on eigen vector matrices, $U_{g_i}$, and eigen value matrices, $D_{g_i}$, obtained via Eigen Value Decompositions (EVDs) performed on channel covariance matrices for the two or more sub-matrices. The method further comprises applying the port-sorting matrix to the re-ordered channel matrix, $H_{re\text{-}order}$, to provide a port-sorted channel matrix, $\tilde{H}_{re\text{-}order}^{ps}$, and re-ordering column vectors in the port-sorted channel matrix, $\tilde{H}_{re\text{-}order}^{ps}$, based on eigen values obtained from the EVDs performed on the channel covariance matrices for the two or more sub-matrices to provide a re-ordered, port-sorted channel matrix, $\tilde{H}_{re\text{-}order}^{ps}$. The method further comprises applying grouping of the re-ordered, port-sorted channel matrix, $\tilde{H}_{re\text{-}order}^{ps}$, and port sorting accordingly to obtain a final port-sorted channel matrix, $\tilde{H}_{final}$. In this manner, port selection complexity is reduced.

In one embodiment, dividing the channel matrix, H, into the two or more sub-matrices comprises computing correlation values, $\rho_{i,j}$, for all pairs of column vectors in the channel matrix, H, and dividing the channel matrix, H, into the two or more sub-matrices based on the correlation values, $\rho_{i,j}$.

In one embodiment, the two or more sub-matrices consist of a first sub-matrix and a second sub-matrix, and dividing the channel matrix, H, into the two or more sub-matrices comprises finding the pair of column vectors in the channel matrix, H, having a highest correlation value from among the correlation values, $\rho_{i,j}$, for all pairs of column vectors in the channel matrix, H; selecting one column vector from the pair of column vectors in the channel matrix, H, having the highest correlation value as a reference column vector; selecting the pair of column vectors in the channel matrix, H, having a highest correlation value and $N_r/2-2$ additional channel vectors having the highest correlation values with respect to the reference column vector as the first sub-matrix; and selecting the $N_r/2$ that are not included in the first-matrix as the second sub-matrix.

In one embodiment, forming the port-sorting matrix comprises, for each sub-matrix of the two or more sub-matrices, computing a channel covariance matrix for the sub-matrix and performing an Eigen Value Decomposition (EVD) on the channel covariance matrix for the sub-matrix. Forming the port-sorting matrix further comprises forming the port-sorting matrix based on the eigen vector matrices, $U_{g_i}$, and the eigen value matrices, $D_{g_i}$, obtained via the EVDs performed on the channel covariance matrices for the two or more sub-matrices.

In one embodiment, the two or more sub-matrices consist of a first sub-matrix and a second sub-matrix, and the port-sorting sub-matrix is computed as:

$$U = \begin{bmatrix} U_{g_1}^* & 0 \\ 0 & U_{g_2}^* \end{bmatrix} \begin{bmatrix} D_{g_1^{-1}}^{-\frac{1}{2}} & 0 \\ 0 & D_{g_{21}}^{-\frac{1}{2}} \end{bmatrix}$$

wherein $U_{g_1}$ is the eigen vector matrix for the first sub-matrix, $D_{g_1}$ is the eigen value matrix for the first sub-matrix, $U_{g_2}$ is the eigen vector matrix for the second sub-matrix, and $D_{g_2}$ is the eigen value matrix for the second sub-matrix.

In one embodiment, applying grouping of the re-ordered, port-sorted channel matrix, $\tilde{H}_{re\text{-}order}^{ps}$, and port sorting accordingly to obtain the final port-sorted channel matrix, $\tilde{H}_{final}$, comprises dividing the re-ordered, port-sorted channel matrix, $\tilde{H}_{re\text{-}order}^{ps}$, into two or more sub-matrices each comprising two or more consecutive column vectors from the re-ordered, port-sorted channel matrix, $\tilde{H}_{re\text{-}order}^{ps}$, and, for each sub-matrix of the two or more sub-matrices of the re-ordered, port-sorted channel matrix, $\tilde{H}_{re\text{-}order}^{ps}$, computing a channel covariance matrix for the sub-matrix of the re-ordered, port-sorted channel matrix, $\tilde{H}_{re\text{-}order}^{ps}$, and performing an EVD on the channel covariance matrix for the sub-matrix of the re-ordered, port-sorted channel matrix, $\tilde{H}_{re\text{-}order}^{ps}$. Applying grouping of the re-ordered, port-sorted channel matrix, $\tilde{H}_{re\text{-}order}^{ps}$, and port sorting accordingly to obtain the final port-sorted channel matrix, $\tilde{H}_{final}$, further comprises forming a second port-sorting matrix based on eigen vector matrices, $N_{s_k}$, and the eigen value matrices, $L_{s_k}$, obtained via the EVDs performed on the channel covariance matrices for the two or more sub-matrices of the re-ordered, port-sorted channel matrix, $\tilde{H}_{re\text{-}order}^{ps}$, and applying the second port-sorting matrix to the re-ordered, port-sorted channel matrix, $\tilde{H}_{re\text{-}order}^{ps}$, to provide the final port-sorted channel matrix, $\tilde{H}_{final}$.

In one embodiment, the method further comprises performing layer selection for the particular UE by selecting a first L columns of the final port-sorted channel matrix, $\tilde{H}_{final}$, wherein L is a number of layers for a current rank of the particular UE.

In one embodiment, the method further comprises computing beamforming weights for a downlink transmission to the particular UE based on the final port-sorted channel matrix, $\tilde{H}_{final}$, or the first L columns of the final port-sorted channel matrix, $\tilde{H}_{final}$.

Corresponding embodiments of a RAN node are also disclosed. In one embodiment, a RAN node is adapted to divide a channel matrix, H, into two or more sub-matrices, wherein the channel matrix, H, is a full channel matrix of one subcarrier of a MIMO channel between an antenna array of the RAN node and a particular UE and each sub-matrix of the two or more sub-matrices comprises two or more column vectors of the channel matrix, H. The RAN node is further adapted to form a re-ordered channel matrix, $H_{re\text{-}order}$, as a concatenation of the two or more sub-matrices and forming a port-sorting matrix based on eigen vector matrices, $U_{g_i}$, and eigen value matrices, $D_{g_i}$, obtained via EVDs performed on channel covariance matrices for the two or more sub-matrices. The RAN node is further adapted to apply the port-sorting matrix to the re-ordered channel matrix, $H_{re\text{-}order}$, to provide a port-sorted channel matrix, $\overline{H}_{re\text{-}order}^{ps}$, and re-order column vectors in the port-sorted channel matrix, $\overline{H}_{re\text{-}order}^{ps}$, based on eigen values obtained from the EVDs performed on the channel covariance matrices for the two or more sub-matrices to provide a re-ordered, port-sorted channel matrix, $\tilde{H}_{re\text{-}order}^{ps}$. The RAN node is further adapted to apply grouping of the re-ordered, port-sorted channel matrix, $\tilde{H}_{re\text{-}order}^{ps}$, and port sorting accordingly to obtain a final port-sorted channel matrix, $\tilde{H}_{final}$.

In another embodiment, a RAN node comprises processing circuitry configured to cause the RAN node to divide a channel matrix, H, into two or more sub-matrices, wherein the channel matrix, H, is a full channel matrix of one subcarrier of a MIMO channel between an antenna array of the RAN node and a particular UE and each sub-matrix of the two or more sub-matrices comprises two or more column vectors of the channel matrix, H. The processing circuitry is further configured to cause the RAN node to form a re-ordered channel matrix, $H_{re\text{-}order}$, as a concatenation of the two or more sub-matrices and forming a port-sorting matrix based on eigen vector matrices, $U_{g_i}$, and eigen value matrices, $D_{g_i}$, obtained via EVDs performed on channel covariance matrices for the two or more sub-matrices. The processing circuitry is further configured to cause the RAN node to apply the port-sorting matrix to the re-ordered channel matrix, $H_{re\text{-}order}$, to provide a port-sorted channel matrix, $\overline{H}_{re\text{-}order}^{ps}$, and re-order column vectors in the port-sorted channel matrix, $\overline{H}_{re\text{-}order}^{ps}$, based on eigen values obtained from the EVDs performed on the channel covariance matrices for the two or more sub-matrices to provide a re-ordered, port-sorted channel matrix, $\tilde{H}_{re\text{-}order}^{ps}$. The processing circuitry is further configured to cause the RAN node to apply grouping of the re-ordered, port-sorted channel matrix, $\tilde{H}_{re\text{-}order}^{ps}$, and port sorting accordingly to obtain a final port-sorted channel matrix, $\tilde{H}_{final}$.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 2A, 2B, and 2C illustrate a flow chart for a low-complexity, robust port selection procedure performed by a Radio Access Network (RAN) node in accordance with one embodiment of the present disclosure;

DETAILED DESCRIPTION

Figure 1:
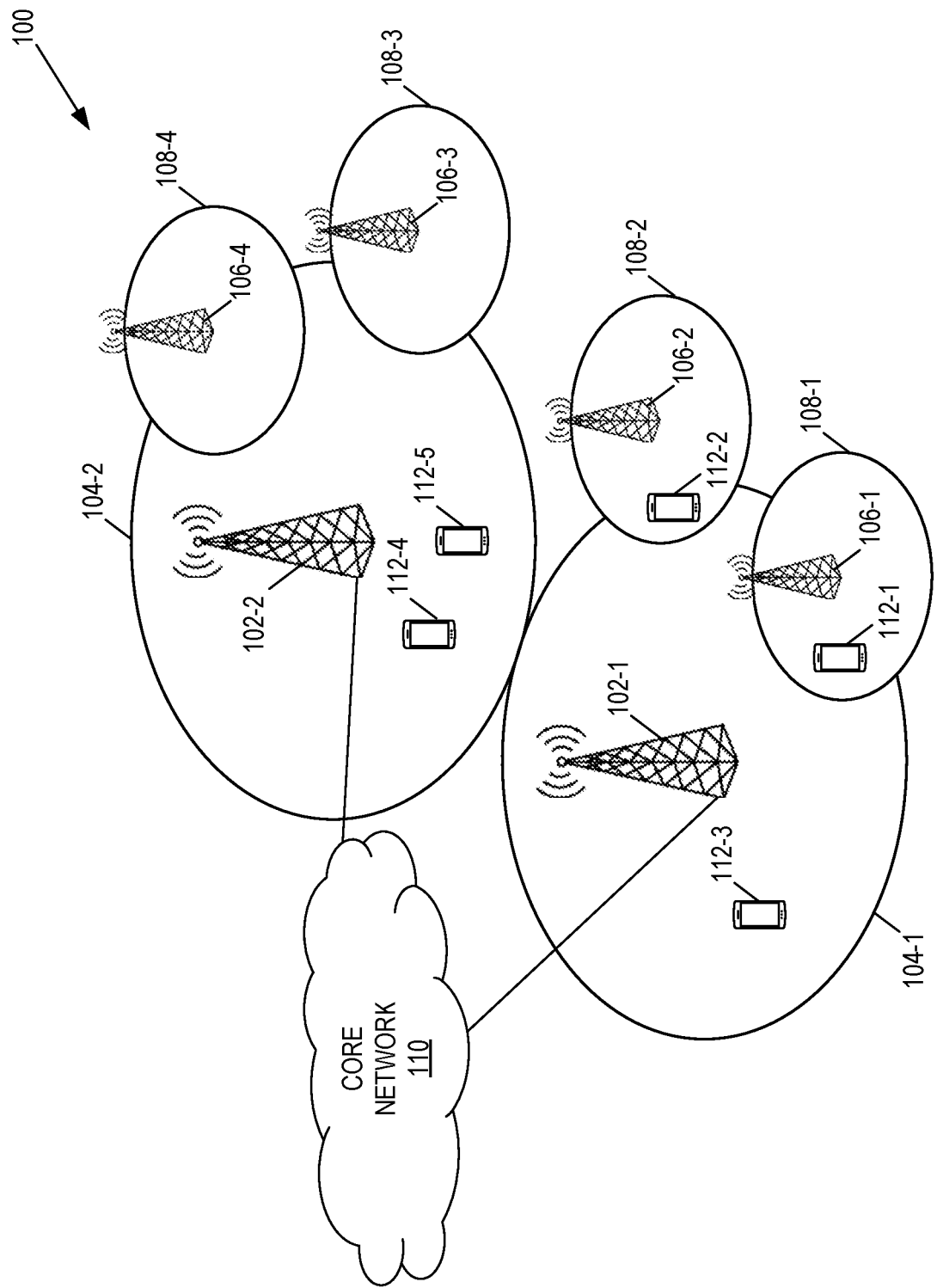
FIG. 1 illustrates one example of a cellular communications system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). As discussed above, when transmitting with a rank (i.e., number of layers) that is below the available number of antennas in the UE, some mapping between Sounding Reference Signal (SRS) ports and transmission layers is required. There are many ways for mapping SRS ports to transmission layers. One approach is to measure the received power from each SRS port in the base station (e.g., gNB) and then sort the ports in order of descending power. With this solution, the strongest SRS port will be used for single layer transmissions, while the two strongest SRS ports are used for dual layer transmissions, and so on. Another aspect to consider is how correlated the SRS signals on the SRS ports are. If the two strongest SRS ports are highly correlated spatially, they may still not be a good pair from a dual layer transmission perspective as there is a risk that the channel properties on these ports degenerates to a rank 1 channel that can only support a single transmission layer. Another limitation with the described method is that it maps one SRS port, e.g. UE antenna, to one transmission layer. What this means is that the beam weight computation only uses information from one of all the available SRS ports/UE antennas in the beam weight computation. Thus, information is lost.

A new solution is proposed in concurrently filed PCT Patent Application entitled "Robust Port Selection" which claims priority to U.S. Provisional Application Ser. No. 63/220,207 entitled "Robust Port Selection, and is referred to herein as the "Robust Portion Selection Application". The new solution described in the Robust Port Selection Application provides a computationally efficient and robust way of projecting the channel estimates into a new domain where the SRS ports are ordered in their order of importance, according to the eigen values of the Eigen Value Decomposition (EVD) used for deriving the projection matrices. The EVD can be derived by either using a wideband channel covariance matrix or a subband channel covariance matrix, e.g. per subcarrier or per group of subcarriers, as the input. The projection step is followed by a selection step per UE. In the selection step, the best ranked SRS ports, according to the eigen values, are mapped to one transmission layer each up to the number of layers supported by the current UE transmission rank. The SRS port sorting and selection algorithm can be used together with any Single User MIMO (SU-MIMO) or Multi-User MIMO (MU-MIMO) beamforming weight computation that relies on channel estimates as its input. Thus, the SRS port sorting procedure is not a beamforming procedure as it does not explicitly produce beam weights.

Even though the solution described in the Robust Port Selection Application is quite promising, it requires an operation of eigen decomposition to a matrix with size of $N_r \times N_r$, so as to obtain the eigenvalues and eigen vectors for the matrix. When the number of $N_r$ is large, for example the typical value is $N_r = 4$ in the typical 5G terminals, the complexity for performing eigen decomposition to a matrix is quite high.

Table 1 is an example complexity analysis for a power iteration based method to obtain the eigen values and eigen vectors of a matrix with size of 4×4.

TABLE 1

| SCG Size | Nr of MACs | Cycles per EVD | Cycles per BW | Nr of DSP per UE | Nr of DSP per Cell | Nr of DSP for 9 Cells |
|---|---|---|---|---|---|---|
| 4 PRBs | 3296 | 824 | 56,032 | 0.160091429 | 5.122925714 | 46.10633143 |
| 2 PRBs | 3296 | 824 | 112,064 | 0.320182857 | 10.24585143 | 92.21266286 |

The assumptions for the above calculation are:
1. Covariance matrix size with 4×4. All four eigenvalues and eigenvectors for this matrix are calculated.
2. Power iteration method is used for computing the EVD, and number of iterations is 10.
3. Each cycle can do four complex multiplications and accumulations (MACs) in parallel.
4. Bandwidth (BW) is with 100 Megahertz (MHZ) and 272 Physical Resource Blocks (PRBs).
5. Each Digital Signal Processor (DSP) can handle (700e6*0.5e−3) cycles.
6. Each cell assumes 32 UEs in a slot for SRS sounding, i.e., Comb4 and 8 cyclic shifts.

It would be good if there can be a low complexity solution with less computational burden while having similar performance as the solution described in the Robust Port Selection Application.

Certain aspects of the present disclosure and their embodiments may provide solutions to the aforementioned or other challenges. Systems and methods are disclosed herein that provide a low complexity but robust port selection procedure for Reciprocity Assisted Transmission (RAT). It utilizes an eigen value decomposition to a smaller matrix size, which helps reduce the complexity. In one embodiment, a low complexity, robust port selection procedure performed by a Radio Access Network (RAN) node includes one or more (or all) of the following steps:

Step 1: The RAN node performs channel grouping by grouping highly correlated channel vectors into respective subgroups (referred to herein as channel groups or channel subgroups), and re-orders the channel matrix by the channel grouping to provide a grouped channel matrix. This step aims to divide the channel matrix in to sub-matrices (one sub-matrix for each channel subgroup), so as to allow the later on EVD operation on each sub-matrix, rather than EVD on the full channel matrix.

Step 2: The RAN node performs port sorting matrix calculation based on the grouped channel matrix. Specifically, the RAN node applies EVD on each channel group (i.e., applies EVD on each sub-matrix of the grouped channel matrix), and forms a port sorting matrix based on the eigen values and eigen vectors of each channel subgroup. The RAN node applies the port sorting matrix on the grouped channel matrix obtained in Step 1 to provide a port sorted channel matrix.

Step 3: The RAN node re-orders the ported sorted channel matrix from Step 2 based on eigen values in descending order of eigen values obtained in Step 2, thereby providing a re-ordered channel matrix.

Step 4: For the re-ordered channel matrix from Step 3, the RAN node applies grouping for such channel matrix to obtain two subgroups. For each group, the RAN node first calculates the covariance matrix and then applies EVD on the each of the group covariance matrix and forming the port sorting matrix accordingly. Apply port sorting matrix on re-ordered channel matrix from Step 3 to obtain a new channel matrix.

Step 5: Layer Selection: The RAN node performs layer selection by selecting the first L columns of the channel matrix obtained from Step 4.

Step 6—Computation of Beamforming Weights: The transformed version of the channel matrix from Step 5 can be directly used by the RAN node in any subsequent beamforming weight computations.

Certain embodiments may provide one or more of the following technical advantage(s). Some example benefits of at least some embodiments of the proposed SRS port selection procedure are:

1. The SRS port selection acts on channel estimates rather than on beam weights. As the channel estimation (in downlink (DL)) comes earlier than the beamforming weight computations this means that SRS port selection method can be calculated offline as a pre-step before the beamforming weight computations are made.
2. The port selection procedure is compatible with any beamforming weight computation procedure for SU-MIMO and MU-MIMO that relies on channel estimates as its input.
3. As the SRS port selection procedure is based on the use of an EVD, it is numerical stable.
4. A projection method is used, where a larger singular value problem is solved by first solving a smaller (simpler) eigen value problem. The eigenvectors are then projected to the channel matrix to generate the solution of the full singular value problem. To further reduce the complexity, a further dimension reduction is performed to the smaller eigen value decomposition, so as to reduce the complexity for computation.

FIG. 1 illustrates one example of a cellular communications system 100 in which embodiments of the present disclosure may be implemented. In the embodiments described herein, the cellular communications system 100 is a 5G system (5GS) including a Next Generation RAN (NG-RAN) and a 5G Core (5GC); however, the present disclosure is not limited thereto. The embodiments described herein may be utilized in any type of wireless network or cellular communication system that utilizes beamforming. In this example, the RAN includes base stations 102-1 and 102-2, which in the 5GS include NR base stations (gNBs) and optionally next generation eNBs (ng-eNBs) (e.g., LTE RAN nodes connected to the 5GC), controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or RRHs, or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5G System (5GS) is referred to as the 5GC. The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs, but the present disclosure is not limited thereto.

Embodiments of the systems and methods disclosed herein provide a computationally efficient and robust way of projecting the channel estimates into a new domain where the SRS ports are ordered in their order of importance, according to the singular values of the eigen decomposition used for deriving the projection matrices. The eigen decomposition can be derived by either using a wideband channel covariance matrix or a subband matrix, e.g. per subcarrier or per group of subcarriers, as the input. The projection step is followed by a selection step per UE. In the selection step, the best ranked SRS ports, according to the singular values, are mapped to one transmission layer each up to the number of layers supported by the current UE transmission rank. The SRS port sorting and selection algorithm can be used together with any SU/MU-MIMO beamforming weight computation that relies on channel estimates as its input. Thus, our SRS port sorting algorithm is not a beamforming algorithm as it does not explicitly produce beam weights.

FIGS. 2A-2C illustrate a flow chart for a low-complexity, robust port selection procedure performed by a RAN node in accordance with one embodiment of the present disclosure. The RAN node may be a base station 102 (e.g., a gNB) or a network node that performs some of the functionality of the base station 102 (e.g., a gNB-DU). The steps of the procedure are as follows.

Step 200—Channel Grouping:
This step divides the channel matrix, H, into two sub-matrices, so as to allow the later on EVD operation on each sub-matrix, rather than EVD on the full channel matrix. The channel matrix, H, is then re-ordered by concatenating the sub-matrices to form a re-ordered channel matrix, $H_{re-order}$.

General Description:
Step 200A—Calculate Correlation for All Combinations of Channel Vectors:
Denote $H \in \mathbb{C}(N_t, N_r)$ as the full channel matrix of one subcarrier selected from one subcarrier group. Denote the i-th column of H as $h_i \in \mathbb{C}(N_t, 1)$. The RAN node calculates the correlation, $\rho_{i,j}$, among all combinations of channel vectors i.e., $$\rho_{i,j} = \frac{|h_i^H h_j|^2}{|h_i|^2 |h_j|^2}.$$

Step 200B—Grouping for First Channel Group
The RAN node finds the two channel vectors, from among all combinations of channel vectors, with the highest correlation value and denotes the indices of these two vectors as [i, j] (step 200B1). Let these two channel vectors be in the first group. Then, the RAN node calculates the norm for the two channel vectors and picks out the channel vector with larger channel norm as a basis (step 200B1). Herein, the index the channel vector selected as the basis is referred to as $l_{basis}$. The RAN node finds the remaining ($N_r/2-2$) channel vectors with the relatively largest correlation values with the $l_{basis}$-th channel vector, to form the first channel group (step 200B3). Thus, the first channel group consists of the two channel vectors with the highest correlation value together with the ($N_r/2-2$) channel vectors with the relatively largest correlation values with the $l_{basis}$-th channel vector. The channel sub-matrix for the first channel group is denoted herein as $H_{g_1} \in$ $$\mathbb{C}\left(N_t, \frac{N_r}{2}\right).$$

Step 200C—Grouping for the Second Channel Group:
The remaining channel vectors apart from those in the first channel group form the second channel group. The channel sub-matrix for the second channel group is denoted herein as $H_{g_2} \in$ $$\mathbb{C}\left(N_t, \frac{N_r}{2}\right).$$

Step 200D—Forming the Re-Ordered Full Channel Matrix:
The RAN node re-orders the full channel matrix H based on the channel grouping as:

$$H_{re-order} = [H_{g_1} \ H_{g_2}]$$

Example for a typical case with $N_r=4$
Grouping for first channel group:
The RAN node find the two channel vectors with highest cross-correlation value, and denotes the indices of these two vectors as [i,j]. Let these two channel vectors be in the first group. Denote the first channel group as $H_{g_1}=H(:,[i,j])$. where $H(:,[i,j])$ means choose the i-th and j-th columns of matrix H.

Grouping for the second channel group:
Let the remaining channel vectors apart from those in the first channel group to form the second channel group. Denote the second channel group as $H_{g_2}=H(:,[m,n])$.
And $\forall i,j \neq \forall m,n$, means any value of i or j is not equal with that of m or n.

Step 202—Port Sorting Matrix Calculation based on Grouped Channel Matrix:
Step 202A—EVD on Each Channel Group:
Step 202A1: For each channel group, the RAN node calculates the channel covariance matrix a $$R_{g_1} = H_{g_1}^T H_{g_1}^*$$
$$R_{g_2} = H_{g_2}^T H_{g_2}^*$$

where $R_{g_1}$ is the channel covariance matrix for the first channel group and $R_{g_2}$ is the channel covariance matrix for the second channel group.

Step 202A2: Then, the RAN node applies EVD on the each of the group channel covariance matrices as follows:

$$R_{g_1} = H_{g_1}^T H_{g_1}^* = U_{g_1} D_{g_1} U_{g_1}^H$$
$$R_{g_2} = H_{g_2}^T H_{g_2}^* = U_{g_2} D_{g_2} U_{g_2}^H$$

The eigen vector matrix and eigen value matrix for each channel group can be obtained as:

$$U_{g_i} \in \mathbb{C}\left(\frac{N_r}{2}, \frac{N_r}{2}\right), D_{g_i} \in \mathbb{C}\left(\frac{N_r}{2}, \frac{N_r}{2}\right), i = 1, 2,$$

where $U_{g_i}$ is the eigen vector matrix for the i-th sub-matrix (or i-th channel group) and $D_{g_i}$ is the eigen value matrix for the i-th sub-matrix (or i-th channel group). As will be appreciated by those of ordinary skill in the art upon reading this disclosure, the columns of the eigen vector matrix $U_{g_i}$ contain the eigen vectors of $R_{g_i}$, and $D_{g_i}$ is a diagonal matrix whose diagonal elements are the corresponding eigen values.

Step 202B-Port Sorting Matrix Formulation:
The RAN node forms the port sorting matrix as follows, $$U = \begin{bmatrix} U_{g1}^* & 0 \\ 0 & U_{g2}^* \end{bmatrix} \begin{bmatrix} D_{g1}^{-\frac{1}{2}} & 0 \\ 0 & D_{g2}^{-\frac{1}{2}} \end{bmatrix}$$

where 0 is a square matrix with size of $$\frac{N_r}{2} \times \frac{N_r}{2},$$

and with all elements as zero.

Step 202C—Apply Port Sorting Matrix on Reordered Channel Matrix:

The RAN node performs port sorting on (i.e., applies the port sorting matrix on) the re-ordered channel matrix $H_{re-order}$ based on the port sorting matrix from Step 202B as follows:

$$\tilde{H}_{re-order}^{ps} = H_{re-order} U = [H_{g1}\ H_{g2}] \begin{bmatrix} U_{g1}^* & 0 \\ 0 & U_{g2}^* \end{bmatrix} \begin{bmatrix} D_{g1}^{-\frac{1}{2}} & 0 \\ 0 & D_{g2}^{-\frac{1}{2}} \end{bmatrix}$$

Step 204—Re-order $\tilde{H}_{re-order}^{ps}$ based on Eigen Values:

After obtaining the port-sorted channel matrix $\tilde{H}_{re-order}^{ps}$ in step 202, the RAN node performs another re-ordering of the channel vectors based on the eigen values in this step. This step re-orders $\tilde{H}_{re-order}^{ps}$ based on the eigen values across both channel groups.

Specifically, the RAN node forms an eigen-value vector as $$d = [\text{diag}(D_{g1})\ \text{diag}(D_{g2})]$$

where diag($D_{g_1}$) represents pick out the diagonal values of matrix $D_{g_1}$ and form a row vector.

The RAN node then sorts the vector d by values in descending order to get a newly sorted index with notation as Ind=$[i_1 i_2 \ldots i_{N_r}]$.

Based on the sorted index Ind=$[i_1 i_2 \ldots i_{N_r}]$, the $\tilde{H}_{re-order}^{ps}$ is sorted accordingly, $$\tilde{H}_{re-order}^{ps} = \tilde{H}_{re-order}^{ps}(:, [i_1\ i_2\ \ldots\ i_{N_r}])$$

which means the k-th column of $\tilde{H}_{re-order}^{ps}$ is the $i_k$-th column of $\tilde{H}_{re-order}^{ps}$ Step 206—Apply Grouping of $\tilde{H}_{re-order}^{ps}$ and Port Sorting Accordingly to Obtain the Final Sorted Channel Matrix:

Step 206A:

The RAN node divides $\tilde{H}_{re-order}^{ps}$ into two sub-groups as follows, $$\tilde{H}_{re-order}^{ps} = [\tilde{V}_{s_1}\ \tilde{V}_{s_2}]$$

where $\tilde{V}_{s_1}$ is the first $$\frac{N_r}{2}$$

columns of $\tilde{H}_{re-order}^{ps}$, and $\tilde{V}_{s_2}$ are the remaining columns of $\tilde{H}_{re-order}^{ps}$.

Step 206B:

For each group, the RAN node first calculate the covariance matrix and then applies EVD on the group covariance matrix as follows $$M_{s_1} = \tilde{V}_{s_1}^T \tilde{V}_{s_1}^* = N_{s_1} L_{s_1} N_{s_1}^H$$

$$M_{s_2} = \tilde{V}_{s_2}^T \tilde{V}_{s_2}^* = N_{s_2} L_{s_2} N_{s_2}^H$$

Step 206C:

The RAN node forms the port sorting matrix as follows, $$N = \begin{bmatrix} N_{s_1}^* & 0 \\ 0 & N_{s_2}^* \end{bmatrix} \begin{bmatrix} L_{s_1}^{-\frac{1}{2}} & 0 \\ 0 & L_{s_2}^{-\frac{1}{2}} \end{bmatrix}$$

Step 206D:

The RAN node applies the port sorting matrix N on reordered channel matrix $\tilde{H}_{re-order}^{ps}$, to obtain a new channel matrix as $$\tilde{H}_{final} = \tilde{H}_{re-order}^{ps} \begin{bmatrix} N_{s_1}^* & 0 \\ 0 & N_{s_2}^* \end{bmatrix} \begin{bmatrix} L_{s_1}^{-\frac{1}{2}} & 0 \\ 0 & L_{s_2}^{-\frac{1}{2}} \end{bmatrix}$$

Step 208—Layers Selection:

Since $\tilde{H}_{final}$ is with dimension of $N_t \times N_r$, when the number of layers for the UE is less than the total antenna ports number of the UE, layer selection is performed by selecting the first L columns of $\tilde{H}_{final}$, i.e., $\tilde{H}_{final}(:,1:L)$.

210—Computation of Beamforming Weights:

The transformed version of the channel matrix $\tilde{H}_{final}(:,1:L)$ can now be directly used in any subsequent beamforming weight computations. For example, if it is SU-MIMO transmission, $W=\tilde{H}_{final}(:,1:L)(\sigma^2 I + \tilde{H}_{final}^T(:,1:L)\tilde{H}_{final}^*(:,1:L))^{-1}$ is directly applied to obtain the SU MMSE beamforming weight for the case of L layers transmission. For a MU-MIMO computation, the channel ports in $\tilde{H}_{final}(:,1:L)$ are picked for each UE when creating the combined channel matrix $\hat{H}$ that holds the SRS ports from all the co-scheduled UE's. Matrix $\hat{H}$ is then used as input to the MU-MIMO weight computation, for example, via the MMSE: $W=\hat{H}(\sigma^2 I + \hat{H}^T \hat{H}^*)^{-1}$.

Note that while the description herein focuses on the use of two channel groups, the present disclosure is not limited thereto. Any number of two or more channel groups may be used. For example, in step 200, the channel matrix H may alternatively be divided into more than two channel groups, e.g., based on the correlation values. For instance, for three channel groups, after the first channel group is formed as described above (but such that sub-matrix for the first channel group includes $N_r/3$ column vectors from the full channel matrix H), the pair of column vectors having a highest correlation value from among those column vectors not already included in the first channel group is found, and one of the two column vectors in that pair is selected as the basis, or reference, for the second channel group. The remaining $N_t/3-2$ column vectors having the highest correlation to the basis for the second channel group are then selected, together with the aforementioned pair of column vectors, for the sub-matrix for the second channel group. The remaining $N_t/3$ column vectors are then selected for the sub-matrix for the third channel group. In a similar manner, the remaining steps of the procedure of FIGS. 2A, 2B, and 2C may be extended for more than two channel groups.

Additional description for calculating eigen values and eigen vectors of a matrix: Regarding to the calculation of eigen values and eigen vectors for a matrix, a lot of mature solutions can be directly applied herein. For example, the power iteration method, etc. What we want to emphasize is that, for a typical example of 4 UE antenna ports case, the above mentioned solution only requires a EVD to a matrix of 2×2, and it is possible to obtain the eigen values and eigen vectors for a 2×2 matrix explicitly and directly as follows. For a 2×2 matrix A, the two eigen values are $$\lambda_1 = \frac{tr(A) + \sqrt{tr^2(A) - 4\det(A)}}{2}$$

$$\lambda_2 = \frac{tr(A) - \sqrt{tr^2(A) - 4\det(A)}}{2}$$

The first column of $(A-\lambda_1 I)$ with normalization is the eigen vector for the first eigen value $\lambda_1$. The first column of $(A-\lambda_2 I)$ with normalization is eigen vector for the second eigen value $\lambda_2$.

Figure 3A:
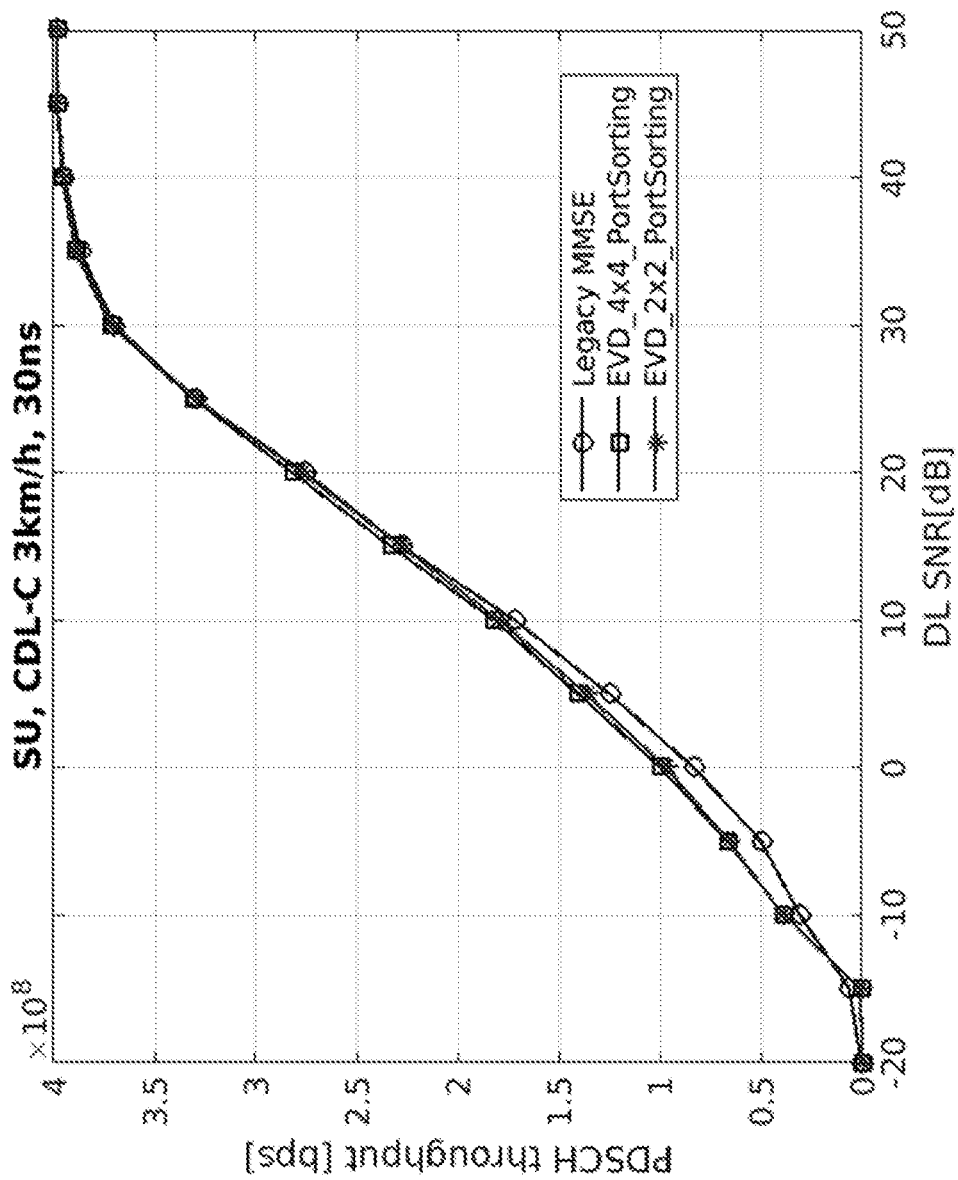
FIGS. 3A and 3B illustrate link level simulation results for example implementations of embodiments of the present disclosure.
Figure 3B:
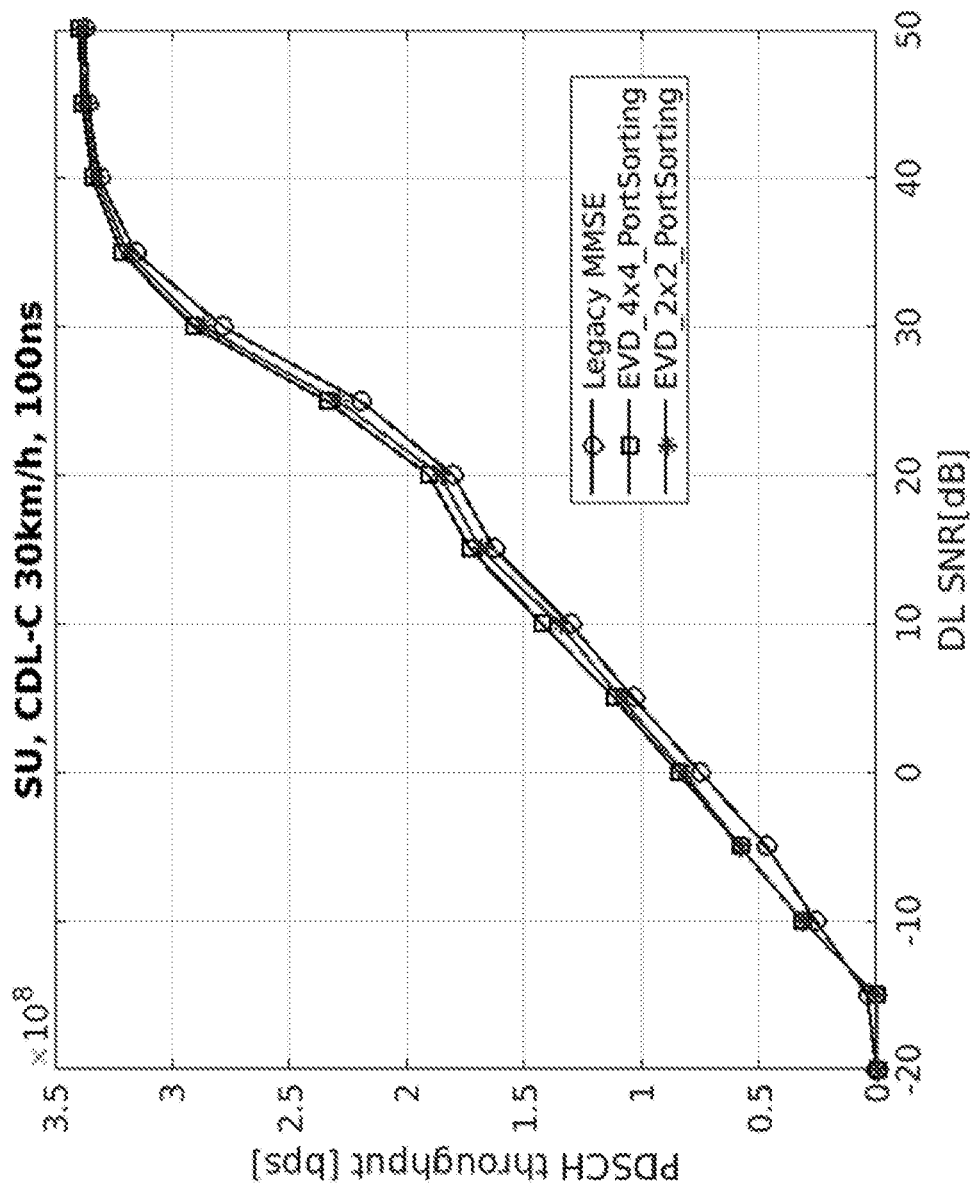

Simulation Results: As illustrated in FIGS. 3A and 3B, link level simulation has been performed to evaluate three algorithms:
1) One example of the above low-complexity robust port selection procedure is denoted in the legend of FIGS. 3A and 3B as 'EVD_2×2_PortSorting'
2) A procedure of applying full EVD for port sorting is denoted in the legend of FIGS. 3A and 3B as 'EVD_4×4_PortSorting'
3) Legacy port sorting based on channel vector power and correlation, is denoted in the legend of FIGS. 3A and 3B as 'Legacy MMSE'
Simulation assumptions are summarized as
Channel Bandwidth: 20 MHZ, SCS: 30 KHz.
BS and UE antenna configurations:
  BS: 64T64R antennas in terms of 8×4×2, UE: 1T4R antennas with SRS antenna switching capability.
DL/UL SNR difference: 26 dB
CSI estimation, i.e., rank selection and SINR estimation, is based on UE reported CSI.
Codebook and CSIRS config.
  32 ports CSIRS, with period as 40 slots.
  codebook (N1,N2)=(8,2), and CSI feedback period is 40 slots.
SRS channel estimator in beam space
1T4R antenna switching, SRS transmission period=40 slots, slot_offset=[0,10,20,30]
From the simulation results, it can be observed that the proposed solution performs better than the legacy port sorting based on channel vector power and correlation and performs quite close to the full EVD for port sorting solution. While the full EVD for port sorting solution requires EVD to a 4×4 matrix, the proposed solution only requires the EVD to 2×2 matrix, and explicit expression is available for the EVD of 2×2 matrix, which can help reduce a lot of computation burden compared with EVD of a 4×4 matrix, which required numerical iterations.

Figure 4:
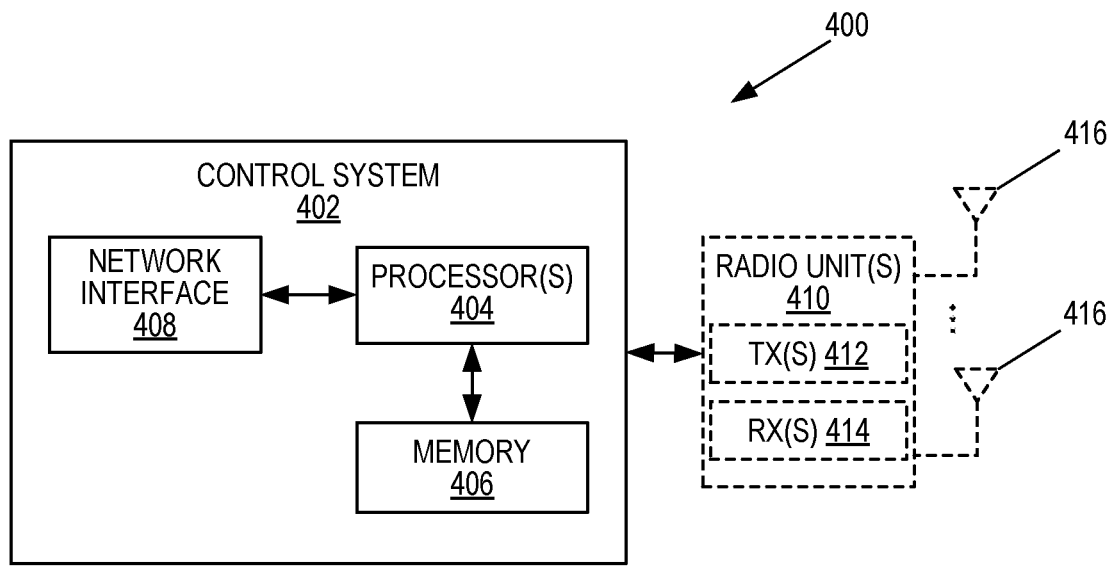
FIGS. 4, 5, and 6 are schematic block diagrams of example embodiments of a RAN node.

FIG. 4 is a schematic block diagram of a RAN node 400 according to some embodiments of the present disclosure. Optional features are represented by dashed boxes. The RAN node 400 may be, for example, a base station 102 or 106 or a network node that implements all or part of the functionality of the base station 102 or gNB described herein. As illustrated, the RAN node 400 includes a control system 402 that includes one or more processors 404 (e.g., Central Processing Units (CPUs), Application Specific Integrated Circuits (ASICs), Field Programmable Gate Arrays (FPGAS), and/or the like), memory 406, and a network interface 408. The one or more processors 404 are also referred to herein as processing circuitry. In addition, the RAN node 400 may include one or more radio units 410 that each includes one or more transmitters 412 and one or more receivers 414 coupled to one or more antennas 416. The radio units 410 may be referred to or be part of radio interface circuitry. In some embodiments, the radio unit(s) 410 is external to the control system 402 and connected to the control system 402 via, e.g., a wired connection (e.g., an optical cable). However, in some other embodiments, the radio unit(s) 410 and potentially the antenna(s) 416 are integrated together with the control system 402. The one or more processors 404 operate to provide one or more functions of the RAN node 400 as described herein (e.g., one or more functions of the base station 102, gNB, or RAN node described above, e.g., with respect to FIGS. 2A-2C). In some embodiments, the function(s) are implemented in software that is stored, e.g., in the memory 406 and executed by the one or more processors 404.

Figure 5:
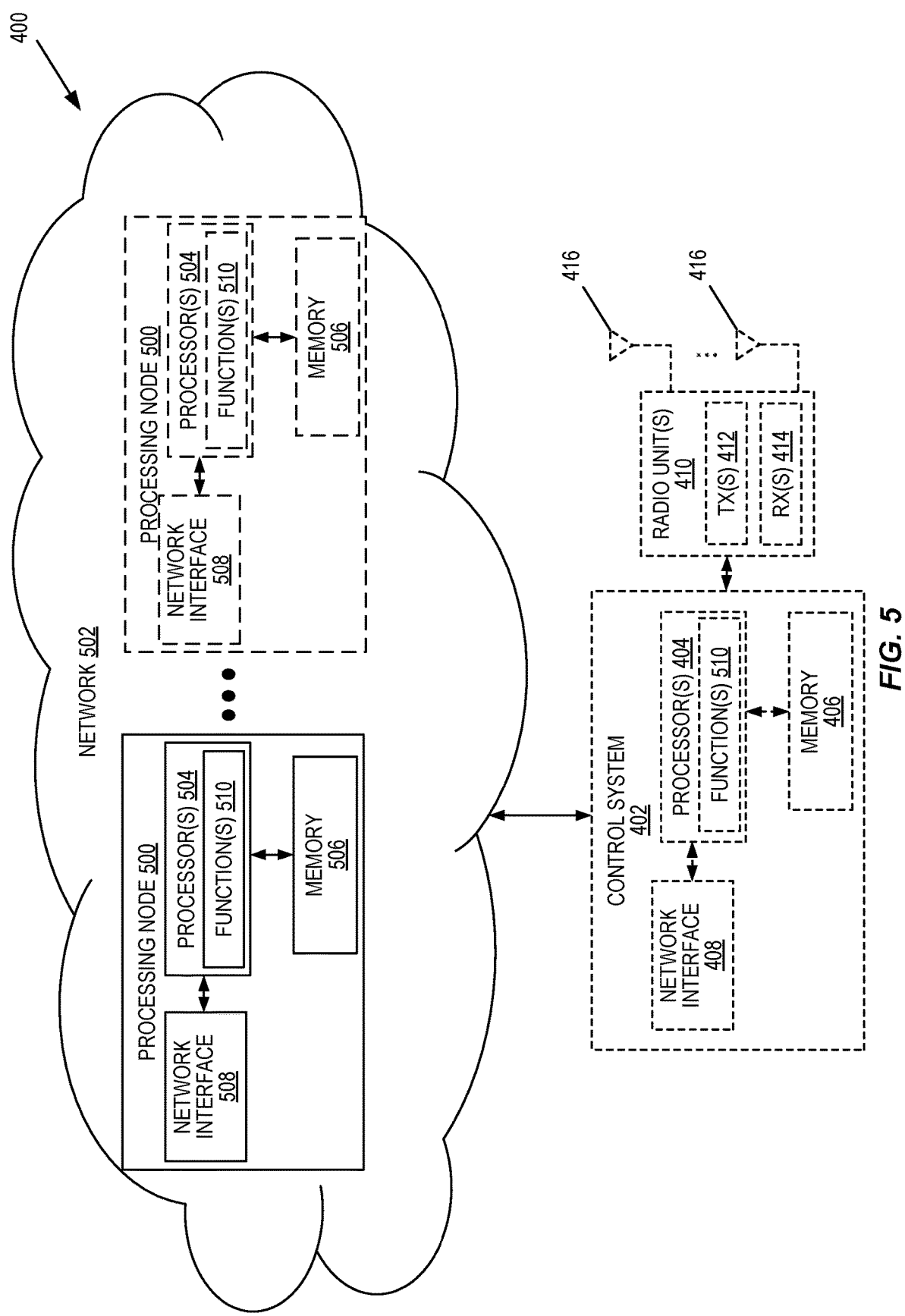

FIG. 5 is a schematic block diagram that illustrates a virtualized embodiment of the RAN node 400 according to some embodiments of the present disclosure. Again, optional features are represented by dashed boxes. As used herein, a "virtualized" RAN is an implementation of the RAN node 400 in which at least a portion of the functionality of the RAN node 400 is implemented as a virtual component(s) (e.g., via a virtual machine(s) executing on a physical processing node(s) in a network(s)). As illustrated, in this example, the RAN node 400 may include the control system 402 and/or the one or more radio units 410, as described above. The control system 402 may be connected to the radio unit(s) 410 via, for example, an optical cable or the like. The RAN node 400 includes one or more processing nodes 500 coupled to or included as part of a network(s) 502. If present, the control system 402 or the radio unit(s) are connected to the processing node(s) 500 via the network 502. Each processing node 500 includes one or more processors 504 (e.g., CPUs, ASICs, FPGAS, and/or the like), memory 506, and a network interface 508.

In this example, functions 510 of the RAN node 400 described herein (e.g., one or more functions of the base station 102, gNB, or RAN node described above, e.g., with respect to FIGS. 2A-2C) are implemented at the one or more processing nodes 500 or distributed across the one or more processing nodes 500 and the control system 402 and/or the radio unit(s) 410 in any desired manner. In some particular embodiments, some or all of the functions 510 of the RAN node 400 described herein are implemented as virtual components executed by one or more virtual machines implemented in a virtual environment(s) hosted by the processing node(s) 500. As will be appreciated by one of ordinary skill in the art, additional signaling or communication between the processing node(s) 500 and the control system 402 is used in order to carry out at least some of the desired functions 510. Notably, in some embodiments, the control system 402 may not be included, in which case the radio unit(s) 410 communicate directly with the processing node(s) 500 via an appropriate network interface(s).

In some embodiments, a computer program including instructions which, when executed by at least one processor, causes the at least one processor to carry out the functionality of RAN node 400 or a node (e.g., a processing node 500) implementing one or more of the functions 510 of the RAN node 400 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 6:
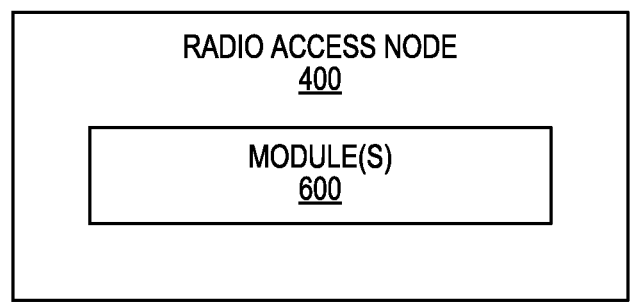

FIG. 6 is a schematic block diagram of the RAN node 400 according to some other embodiments of the present disclosure. The RAN node 400 includes one or more modules 600, each of which is implemented in software. The module(s) 600 provide the functionality of the RAN node 400 described herein (e.g., one or more functions of the base station 102, gNB, or RAN node described above, e.g., with respect to FIGS. 2A-2C). This discussion is equally applicable to the processing node 500 of FIG. 5 where the modules 600 may be implemented at one of the processing nodes 500 or distributed across multiple processing nodes 500 and/or distributed across the processing node(s) 500 and the control system 402.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Embodiment 1: A method performed by a radio access network, RAN, node, the method comprising:
dividing (200) a channel matrix, H, into two or more sub-matrices, wherein:
the channel matrix, H, is a full channel matrix of one subcarrier of a Multiple-Input-Multiple-Output, MIMO, channel between an antenna array of the RAN node and a particular User Equipment, UE; and
each sub-matrix of the two or more sub-matrices comprises two or more column vectors of the channel matrix, H;
forming (200) a re-ordered channel matrix, $H_{re\text{-}order}$, as a concatenation of the two or more sub-matrices;
forming (202; 202A-202B) a port-sorting matrix based on eigen vector matrices, $U_{g_i}$, and eigen value matrices, $D_{g_i}$, obtained via Eigen Value Decompositions, EVDs, performed on channel covariance matrices for the two or more sub-matrices;
applying (202; 202C) the port-sorting matrix to the re-ordered channel matrix, $H_{re\text{-}order}$, to provide a port-sorted channel matrix, $\bar{H}_{re\text{-}order}^{ps}$;
re-ordering (204) column vectors in the port-sorted channel matrix, $\bar{H}_{re\text{-}order}^{ps}$, based on eigen values obtained from the EVDs performed on the channel covariance matrices for the two or more sub-matrices to provide a re-ordered, port-sorted channel matrix, $\tilde{H}_{re\text{-}order}^{ps}$; and
applying (206) grouping of the re-ordered, port-sorted channel matrix, $\tilde{H}_{re\text{-}order}^{ps}$, and port sorting accordingly to obtain a final port-sorted channel matrix, $\tilde{H}_{final}$.

Embodiment 2: The method of embodiment 1 wherein dividing (200) the channel matrix, H, into the two or more sub-matrices comprises:
computing (200A) correlation values, $\rho_{i,j}$, for all pairs of column vectors in the channel matrix, H; and
dividing (200B, 200C) the channel matrix, H, into the two or more sub-matrices based on the correlation values, $\rho_{i,j}$.

Embodiment 3: The method of embodiment 1 wherein the two or more sub-matrices consist of a first sub-matrix and a second sub-matrix, and dividing (200) the channel matrix, H, into the two or more sub-matrices comprises:
finding (200B1) the pair of column vectors in the channel matrix, H, having a highest correlation value from among the correlation values, $\rho_{i,j}$, for all pairs of column vectors in the channel matrix, H;
selecting (200B2) one column vector from the pair of column vectors in the channel matrix, H, having the highest correlation value as a reference column vector;
selecting (200B3) the pair of column vectors in the channel matrix, H, having a highest correlation value and $N_r/2-2$ additional channel vectors having the highest correlation values with respect to the reference column vector as the first sub-matrix; and
selecting (200C) the $N_r/2$ that are not included in the first-matrix as the second sub-matrix.

Embodiment 4: The method of any of embodiments 1 to 3 wherein forming (202; 202A-202B) the port-sorting matrix comprises:
for each sub-matrix of the two or more sub-matrices:
computing (202; 202A; 202A1) a channel covariance matrix for the sub-matrix;
performing (202; 202A; 202A2) an Eigen Value Decomposition, EVD, on the channel covariance matrix for the sub-matrix;
forming (202B) the port-sorting matrix based on the eigen vector matrices, $U_{g_i}$, and the eigen value matrices, $D_{g_i}$, obtained via the EVDs performed on the channel covariance matrices for the two or more sub-matrices.

Embodiment 5: The method of any of embodiments 1 to 4 wherein the two or more sub-matrices consist of a first sub-matrix and a second sub-matrix, and the port-sorting sub-matrix is computed as:

$$U = \begin{bmatrix} U_{g_1}^* & 0 \\ 0 & U_{g_2}^* \end{bmatrix} \begin{bmatrix} D_{g_1}^{-\frac{1}{2}} & 0 \\ 0 & D_{g_2}^{-\frac{1}{2}} \end{bmatrix}$$

wherein $U_{g_1}$ is the eigen vector matrix for the first sub-matrix, $D_{g_1}$ is the eigen value matrix for the first sub-matrix, $U_{g_2}$ is the eigen vector matrix for the second sub-matrix, and $D_{g_2}$ is the eigen value matrix for the second sub-matrix.

Embodiment 6: The method of any of embodiments 1 to 5 wherein applying (206) grouping of the re-ordered, port-sorted channel matrix, $\tilde{H}_{re-order}^{ps}$, and port sorting accordingly to obtain the final port-sorted channel matrix, $\tilde{H}_{final}$, comprises:
- dividing (206A) the re-ordered, port-sorted channel matrix, $\tilde{H}_{re-order}^{ps}$, into two or more sub-matrices each comprising two or more consecutive column vectors from the re-ordered, port-sorted channel matrix, $\tilde{H}_{re-order}^{ps}$;
- for each sub-matrix of the two or more sub-matrices of the re-ordered, port-sorted channel matrix, $\tilde{H}_{re-order}^{ps}$:
  - computing (206B) a channel covariance matrix for the sub-matrix of the re-ordered, port-sorted channel matrix, $\tilde{H}_{re-order}^{ps}$;
  - performing (206B) an EVD on the channel covariance matrix for the sub-matrix of the re-ordered, port-sorted channel matrix, $\tilde{H}_{re-order}^{ps}$;
- forming (206C) a second port-sorting matrix based on eigen vector matrices, $N_{s_k}$, and the eigen value matrices, $L_{s_k}$, obtained via the EVDs performed on the channel covariance matrices for the two or more sub-matrices of the re-ordered, port-sorted channel matrix, $\tilde{H}_{re-order}^{ps}$;
- applying (206D) the second port-sorting matrix to the re-ordered, port-sorted channel matrix, $\tilde{H}_{re-order}^{ps}$, to provide the final port-sorted channel matrix, $\tilde{H}_{final}$.

Embodiment 7: The method of any of embodiments 1 to 6 further comprising performing (208) layer selection for the particular UE by selecting a first L columns of the final port-sorted channel matrix, $\tilde{H}_{final}$, wherein L is a number of layers for a current rank of the particular UE.

Embodiment 8: The method of any of embodiments 1 to 7 further comprising computing (210) beamforming weights for a downlink transmission to the particular UE based on the final port-sorted channel matrix, $\tilde{H}_{final}$, or the first L columns of the final port-sorted channel matrix, $\tilde{H}_{final}$.

Embodiment 9: A radio access network, RAN, node adapted to perform the method of any of embodiments 1 to 8.

Embodiment 10: A radio access network, RAN, node (400) comprising processing circuitry (404; 504) configured to cause the RAN node (400) to perform the method of any of embodiments 1 to 8.

Those skilled in the art will recognize improvements and modifications to the embodiments of the present disclosure. All such improvements and modifications are considered within the scope of the concepts disclosed herein.

The invention claimed is:

1. A method performed by a radio access network, RAN, node, the method comprising:
   dividing a channel matrix, H, into two or more sub-matrices, wherein:
      the channel matrix, H, is a full channel matrix of one subcarrier of a Multiple-Input-Multiple-Output, MIMO, channel between an antenna array of the RAN node and a particular User Equipment, UE; and
      each sub-matrix of the two or more sub-matrices comprises two or more column vectors of the channel matrix, H;
   forming a re-ordered channel matrix, $H_{re-order}$, as a concatenation of the two or more sub-matrices;
   forming a port-sorting matrix based on eigen vector matrices, $U_{g_i}$, and eigen value matrices, $D_{g_i}$, obtained via Eigen Value Decompositions, EVDs, performed on channel covariance matrices for the two or more sub-matrices;
   applying the port-sorting matrix to the re-ordered channel matrix, $H_{re-order}$, to provide a port-sorted channel matrix, $\overline{H}_{re-order}^{ps}$;
   re-ordering column vectors in the port-sorted channel matrix, $\overline{H}_{re-order}^{ps}$, based on eigen values obtained from the EVDs performed on the channel covariance matrices for the two or more sub-matrices to provide a re-ordered, port-sorted channel matrix, $\tilde{H}_{re-order}^{ps}$; and
   applying grouping of the re-ordered, port-sorted channel matrix, $\tilde{H}_{re-order}^{ps}$, and port sorting accordingly to obtain a final port-sorted channel matrix, $\tilde{H}_{final}$; and
   transmitting a downlink transmission to the particular UE based on the final port-sorted channel matrix or the first L columns of the final port-sorted channel matrix.

2. The method of claim 1 wherein dividing the channel matrix, H, into the two or more sub-matrices comprises:
   computing correlation values, $\rho_{i,j}$, for all pairs of column vectors in the channel matrix, H; and
   dividing the channel matrix, H, into the two or more sub-matrices based on the correlation values, $\rho_{i,j}$.

3. The method of claim 1 wherein the two or more sub-matrices consist of a first sub-matrix and a second sub-matrix, and dividing the channel matrix, H, into the two or more sub-matrices comprises:
   finding the pair of column vectors in the channel matrix, H, having a highest correlation value from among the correlation values, $\rho_{i,j}$, for all pairs of column vectors in the channel matrix, H;
   selecting one column vector from the pair of column vectors in the channel matrix, H, having the highest correlation value as a reference column vector;
   selecting the pair of column vectors in the channel matrix, H, having a highest correlation value and $N_t/2-2$ additional channel vectors having the highest correlation values with respect to the reference column vector as the first sub-matrix; and
   selecting the $N_t/2$ that are not included in the first-matrix as the second sub-matrix.

4. The method of claim 1 wherein forming the port-sorting matrix comprises:
   for each sub-matrix of the two or more sub-matrices:
      computing a channel covariance matrix for the sub-matrix; and
      performing an Eigen Value Decomposition, EVD, on the channel covariance matrix for the sub-matrix; and
   forming the port-sorting matrix based on the eigen vector matrices, $U_{g_i}$, and the eigen value matrices, $D_{g_i}$, obtained via the EVDs performed on the channel covariance matrices for the two or more sub-matrices.

5. The method of claim 1 wherein the two or more sub-matrices consist of a first sub-matrix and a second sub-matrix, and the port-sorting sub-matrix is computed as:

$$U = \begin{bmatrix} U_{g_1}^* & 0 \\ 0 & U_{g_2}^* \end{bmatrix} \begin{bmatrix} D_{g_1}^{-\frac{1}{2}} & 0 \\ 0 & D_{g_2}^{-\frac{1}{2}} \end{bmatrix}$$

wherein $U_{g_1}$ is the eigen vector matrix for the first sub-matrix, $D_{g_1}$ is the eigen value matrix for the first sub-matrix, $U_{g_2}$ is the eigen vector matrix for the second sub-matrix, and $D_{g_2}$ is the eigen value matrix for the second sub-matrix.

6. The method of claim 1 wherein applying grouping of the re-ordered, port-sorted channel matrix, $\tilde{H}_{re-order}^{ps}$, and port sorting accordingly to obtain the final port-sorted channel matrix, $\tilde{H}_{final}$, comprises:
 dividing the re-ordered, port-sorted channel matrix, $\tilde{H}_{re-order}^{ps}$, into two or more sub-matrices each comprising two or more consecutive column vectors from the re-ordered, port-sorted channel matrix, $\tilde{H}_{re-order}^{ps}$;
 for each sub-matrix of the two or more sub-matrices of the re-ordered, port-sorted channel matrix, $\tilde{H}_{re-order}^{ps}$:
  computing a channel covariance matrix for the sub-matrix of the re-ordered, port-sorted channel matrix, $\tilde{H}_{re-order}^{ps}$; and
  performing an EVD on the channel covariance matrix for the sub-matrix of the re-ordered, port-sorted channel matrix, $\tilde{H}_{re-order}^{ps}$;
 forming a second port-sorting matrix based on eigen vector matrices, $N_{s_k}$, and the eigen value matrices, $L_{s_k}$, obtained via the EVDs performed on the channel covariance matrices for the two or more sub-matrices of the re-ordered, port-sorted channel matrix, $\tilde{H}_{re-order}^{ps}$; and
 applying the second port-sorting matrix to the re-ordered, port-sorted channel matrix, $\tilde{H}_{re-order}^{ps}$, to provide the final port-sorted channel matrix, $\tilde{H}_{final}$.

7. The method of claim 1 further comprising performing layer selection for the particular UE by selecting a first L columns of the final port-sorted channel matrix, $\tilde{H}_{final}$, wherein L is a number of layers for a current rank of the particular UE.

8. The method of claim 1 further comprising computing beamforming weights for a downlink transmission to the particular UE based on the final port-sorted channel matrix, $\tilde{H}_{final}$, or the first L columns of the final port-sorted channel matrix, $\tilde{H}_{final}$.

9. A radio access network, RAN, node comprising processing circuitry configured to cause the RAN node to:
 divide a channel matrix, H, into two or more sub-matrices, wherein:
  the channel matrix, H, is a full channel matrix of one subcarrier of a Multiple-Input-Multiple-Output, MIMO, channel between an antenna array of the RAN node and a particular User Equipment, UE; and
  each sub-matrix of the two or more sub-matrices comprises two or more column vectors of the channel matrix, H;
 form a re-ordered channel matrix, $H_{re-order}$, as a concatenation of the two or more sub-matrices;
 form a port-sorting matrix based on eigen vector matrices, $U_{g_i}$, and eigen value matrices, $D_{g_i}$, obtained via Eigen Value Decompositions, EVDs, performed on channel covariance matrices for the two or more sub-matrices;
 apply the port-sorting matrix to the re-ordered channel matrix, $H_{re-order}$, to provide a port-sorted channel matrix, $\tilde{H}_{re-order}^{ps}$;
 re-order column vectors in the port-sorted channel matrix, $\tilde{H}_{re-order}^{ps}$, based on eigen values obtained from the EVDs performed on the channel covariance matrices for the two or more sub-matrices to provide a re-ordered, port-sorted channel matrix, $\tilde{H}_{re-order}^{ps}$; and
 apply grouping of the re-ordered, port-sorted channel matrix, $\tilde{H}_{re-order}^{ps}$, and port sorting accordingly to obtain a final port-sorted channel matrix, $\tilde{H}_{final}$; and
 transmitting a downlink transmission to the particular UE based on the final port-sorted channel matrix or the first L columns of the final port-sorted channel matrix.

10. The RAN node of claim 9 wherein, in order to divide the channel matrix, H, into the two or more sub-matrices, the processing circuitry is further configured to cause the RAN node to:
 compute correlation values, $\beta_{i,j}$, for all pairs of column vectors in the channel matrix, H; and
 divide the channel matrix, H, into the two or more sub-matrices based on the correlation values, $\rho_{i,j}$.

11. The RAN node of claim 9 wherein the two or more sub-matrices consist of a first sub-matrix and a second sub-matrix, and, in order to divide the channel matrix, H, into the two or more sub-matrices, the processing circuitry is further configured to cause the RAN node to:
 find the pair of column vectors in the channel matrix, H, having a highest correlation value from among the correlation values, $\rho_{i,j}$, for all pairs of column vectors in the channel matrix, H;
 select one column vector from the pair of column vectors in the channel matrix, H, having the highest correlation value as a reference column vector;
 select the pair of column vectors in the channel matrix, H, having a highest correlation value and $N_r/2-2$ additional channel vectors having the highest correlation values with respect to the reference column vector as the first sub-matrix; and
 select the $N_r/2$ that are not included in the first-matrix as the second sub-matrix.

12. The RAN node of claim 11 wherein, in order to form the port-sorting matrix, the processing circuitry is further configured to cause the RAN node to:
 for each sub-matrix of the two or more sub-matrices:
  compute a channel covariance matrix for the sub-matrix;
  perform an Eigen Value Decomposition, EVD, on the channel covariance matrix for the sub-matrix;
 form the port-sorting matrix based on the eigen vector matrices, $U_{g_i}$, and the eigen value matrices, $D_{g_i}$, obtained via the EVDs performed on the channel covariance matrices for the two or more sub-matrices.

13. The RAN node of claim 11 wherein the two or more sub-matrices consist of a first sub-matrix and a second sub-matrix, and the port-sorting sub-matrix is computed as:

$$U = \begin{bmatrix} U_{g_1}^* & 0 \\ 0 & U_{g_2}^* \end{bmatrix} \begin{bmatrix} D_{g_1}^{-\frac{1}{2}} & 0 \\ 0 & D_{g_2}^{-\frac{1}{2}} \end{bmatrix}$$

wherein $U_{g_1}$ is the eigen vector matrix for the first sub-matrix, $D_{g_1}$ is the eigen value matrix for the first sub-matrix, $U_{g_2}$ is the eigen vector matrix for the second sub-matrix, and $D_{g_2}$ is the eigen value matrix for the second sub-matrix.

14. The RAN node of claim 9 wherein, in order to apply grouping of the re-ordered, port-sorted channel matrix, $\tilde{H}_{re\text{-}order}^{ps}$, and port sorting accordingly to obtain the final port-sorted channel matrix, $\tilde{H}_{final}$, the processing circuitry is further configured to cause the RAN node to:

- divide the re-ordered, port-sorted channel matrix, $\tilde{H}_{re\text{-}order}^{ps}$, into two or more sub-matrices each comprising two or more consecutive column vectors from the re-ordered, port-sorted channel matrix, $\tilde{H}_{re\text{-}order}^{ps}$;
- for each sub-matrix of the two or more sub-matrices of the re-ordered, port-sorted channel matrix, $\tilde{H}_{re\text{-}order}^{ps}$:
  - compute a channel covariance matrix for the sub-matrix of the re-ordered, port-sorted channel matrix, $\tilde{H}_{re\text{-}order}^{ps}$;
  - perform an EVD on the channel covariance matrix for the sub-matrix of the re-ordered, port-sorted channel matrix, $\tilde{H}_{re\text{-}order}^{ps}$;
- form a second port-sorting matrix based on eigen vector matrices, $N_{s_k}$, and the eigen value matrices, $L_{s_k}$, obtained via the EVDs performed on the channel covariance matrices for the two or more sub-matrices of the re-ordered, port-sorted channel matrix, $\tilde{H}_{re\text{-}order}^{ps}$;
- apply the second port-sorting matrix to the re-ordered, port-sorted channel matrix, $\tilde{H}_{re\text{-}order}^{ps}$, to provide the final port-sorted channel matrix, $\tilde{H}_{final}$.

15. The RAN node of claim 9 wherein the processing circuitry is further configured to cause the RAN node to perform layer selection for the particular UE by selecting a first L columns of the final port-sorted channel matrix, $\tilde{H}_{final}$, wherein L is a number of layers for a current rank of the particular UE.

16. The RAN node of claim 9 wherein the processing circuitry is further configured to cause the RAN node to compute beamforming weights for a downlink transmission to the particular UE based on the final port-sorted channel matrix, $\tilde{H}_{final}$, or the first L columns of the final port-sorted channel matrix, $\tilde{H}_{final}$.

* * * * *